3,051,745
NEW IODINE-CONTAINING AMINOBENZOIC ACID AMIDES AND A METHOD OF PRODUCING THE SAME
Werner Herrmann Obendorf, Linz, Austria, assignor to Osterreichische Stickstoffwerke Aktiengesellschaft, Linz, Austria
No Drawing. Filed June 29, 1959, Ser. No. 823,316
Claims priority, application Austria July 23, 1958
8 Claims. (Cl. 260—518)

This invention relates to new iodine-containing aminobenzoic acid amides, particularly to new and useful 3-amino-2,4,6-triiodobenzoic acid amides, and to a method of producing the same.

The invention provides new, useful 3-amino-2,4,6-triiodobenzoic acid amides, which are valuable X-ray contrast agents, particularly X-ray contrast agents for cholecystography, for oral administration.

The invention provides further a new, simple and advantageous method of producing such 3-amino-2,4,6-triiodobenzoic acid amides.

Further subject matters and useful faetures of the invention will become apparent from the following specification.

The new iodine-containing aminobenzoic acid amides correspond basically to the general formula

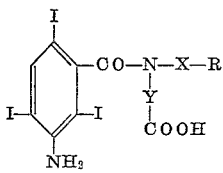

In this formula X is a radical selected from the class consisting of the alkylene radicals having 1–7 carbon atoms, the cycloalkylene radicals having 5–6 carbon atoms, and the phenylene radical, Y is a radical selected of the class consisting of the alkylene radicals having 1–8 carbon atoms and the cycloalkylene radicals having 5–6 carbon atoms, and R is a representative of the class consisting of the hydrogen atom, the lower alkyl residue having 1–3 carbon atoms, the hydroxyl group, the carboxyl group, and the group

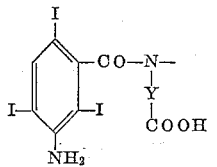

wherein Y has the meaning defined above.

It has been found that after intravenous and oral administration these new iodated aminobenzoic acid amides enrich in the gall-bladder to such a degree that they are eminently suitable for the X-ray diagnosis for the gall organs. For this purpose the compounds according to the present invention may be orally taken either as free acids or in the form of the non-toxic salts. The non-toxic salts include, above all, those with inorganic bases, such as the sodium and lithium salts, and those with organic bases, such as the diethanolamine and methyl glucosamine salts. The free acids as well as the non-toxic salts can be processed together with binders such as starch, talc, polyethylene glycol, magnesium stearate, or starch and lactose to form tablets. The same mixtures may also be used to make cores for dragées. The iodated aminobenzoic acid amides according to the present invention can also be filled in gelatine capsules, including sealed ones, and can be taken in this form. For this purpose either the pure substance or a mixture of the substance with an oil which does not deteriorate the gelatine is used.

The iodated aminobenzoic acid amides according to the present invention are also capable of forming stable clear solutions suitable for injection.

The method of producing the compounds of the invention, having the above formula, comprises basically the introduction of the 3-amino-2,4,6-triiodobenzoyl residue into amino acids of the formula

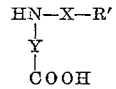

wherein R' is a representative of the class consisting of the hydrogen atom, the lower alkyl residues having 1–3 carbon atoms, the hydroxyl group, the carboxyl group and the group

and wherein X and Y have the meanings defined above.

To carry out the synthesis, 3-amino-2,4,6-triodobenzoyl chloride is reacted with amino acid esters of the formula

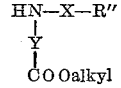

wherein R'' is a representative of the group consisting of the hydrogen atom, the lower alkyl groups having 1–3 carbon atoms, the hydroxyl group, the carboxyl group and the residue

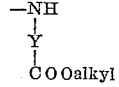

and X and Y have the meanings defined above, at temperatures below 160° C., whereafter the ester group is saponified, e.g., by the action of alcoholic alkali hydroxides. In this way the alkali salts of the compounds according to the invention, having the above-mentioned general formula, are obtained, which may be transformed into the free acids by a treatment with mineral acids. When alkylene diamino-bis-alkanecarboxylic acids are reacted with the acid chloride, both amino groups will react and alkylenediamino-N,N'-bis-(3 - amino - 2,4,6-triiodobenzoyl)-N,N'-bis-alkanecarboxylic acids will be formed. The reaction of phenylenediamino-bis-alkanecarboxylic acids with 3-amino-2,4,6-triiodobenzoyl chloride or the corresponding 3-thionylamino acid chloride and the appertaining products are not intended to be covered by the present application.

Acid-combining agents, such as tertiary amines, e.g. trialkylamine, may be added to the reaction mixture in some cases.

The same result is obtained when the amino acid esters of the above formula are reacted with the thionylamino-2,4,6-triiodobenzoyl chloride. It has also been found that when at least 2 equivalents of the amino acid ester are used per one mole of thionylamino acid chloride in the presence of some water the thionylamino group is already transformed into the amino group during the reaction so that the aminotriiodobenzoyl compounds according to the invention are directly obtained also when the thionylamino acid chloride is used.

Both variants of the method may be used without an addition of solvent or in an inert organic solvent. Such inert organic solvents include, e.g., aliphatic ketones, ethers or dioxane.

The previously unknown 3-thionylamino-2,4,6-triiodobenzoyl chloride can be obtained from 3-amino-2,4,6-triiodo-benzoic acid by a reaction with thionyl chloride. By a treatment of thionylamino-triiodobenzoyl chloride with alkalies in the cold, 3-amino-2,4,6-triiodobenzoyl chloride, which has not been described before either, can also be produced in a simple manner. These compounds have properties which are unusual for acid chlorides. For instance, when 3-amino-2,4,6-triiodobenzoyl chloride is boiled with 1 n sodium hydroxide solution the chloride melts under the solution without reacting therewith. As contrasted with known aminocarboxylic acid chlorides the compound shows no tendency to react with itself. The new 3-thionylamino-2,4,6-triiodobenzoyl chloride, on the other hand, may be transformed with aqueous alkaline solutions into the 3-amino-2,4,6-triiodobenzoyl chloride without deterioration of the acid chloride grouping.

In spite of this surprising stability in an aqueous medium these acid chlorides react in organic solvents and even without an addition of solvents very quickly and smoothly, partly with a substantial development of heat, with the amino acid derivatives of the above-mentioned formula to form the corresponding disubstituted amides. This mode of reaction is particularly surprising because the amazing inactivity in an aqueous medium would suggest a similar inactivity in organic solvents and in any case would not suggest a quick, almost violent reaction.

The following examples serve to illustrate the present invention more fully without restricting the same.

*Example 1*

110.0 grams 3-amino-2,4,6-triiodobenzoic acid have 250 milliliters thionyl chloride added thereto and are then heated at a bath temperature of 50–55° C. with stirring. After 65 minutes all has dissolved to form a clear solution. The stirring of the reaction mixture is continued for 30 minutes at the same temperature whereafter the surplus thionyl chloride is distilled off at about 400 mm. Hg and the oily residue is caused to crystallize. 3-thionylamino-2,4,6-triiodobenzoyl chloride is obtained in an almost quantitative yield. Melting point 107–109° C.

13.11 grams 3-thionylamino-2,4,6-triiodobenzoyl chloride are dissolved in 13 milliliters dioxane and 11 grams sarcosine ethyl ester are carefully added. After the gradual termination of the reaction the mixture is boiled for 5 minutes with refluxing. Thereafter 3 milliliters water are added to the reaction mixture, which is again heated for 2 minutes with refluxing. $SO_2$ escapes when the reaction solution is poured into 100 milliliters water and 25 milliliters 4 n HCl. The ether extract washed with sodium carbonate solution and dried gives 13.28 g. 3-amino-2,4,6-triiodobenzoyl-sarcosine ethyl ester as an evaporation residue.

12.56 grams of this ester have 15 milliliters methanol and 10 milliliters 2.14 n methanolic NaOH added thereto and when poured into ether after short boiling give 11.4 grams almost white 3-amino-2,4,6-triiodobenzoyl-sarcosine-sodium. Yield: 83.2% of theory.

*Example 2*

111.0 grams 3-amino-2,4,6-triodobenzoic acid are reacted with 250 milliliters thionyl chloride as described in Example 1 and the surplus thionyl chloride is distilled off. The remaining oily residue is cooled and dissolved in 300 milliliters ether. The clear ether solution is washed twice at 0° C. with 300-milliliter portions of water, to which some common salt had been added to increase the density. Thereafter the thionyl group is eliminated with somewhat more than the calculated amount of about 6–7% NaOH. The remaining ethereal solution is washed three times with 200-milliliter portions of ice water, to which common salt had been added, and is then dried with common salt and filtered over potash. The solution is then concentrated by the distillation of ether until crystallization occurs upon pasting. After the solution has cooled, 106.85 grams 3-amino-2,4,6-triiodobenzoyl chloride having a melting point of 93.5–95° C. are obtained. Yield 92.94%.

14.4 grams crude N-phenylglycine ethyl ester have 21.4 grams 3-amino-2,4,6-triiodobenzoyl chloride added thereto and are carefully heated to 100° C. The resulting melt is heated on the water bath for 2–3 hours and is then dissolved in a small amount of dimethyl formamide and poured into 500 milliliters water and about 30 milliliters 4 n HCl. The ether extract is washed with water, dilute HCl, $KHCO_3$ and dilute KOH. The evaporation residue is saponified by boiling with a surplus of methanolic NaOH (saponification time about 20 minutes). The methanolic solution is diluted with water to about 600 milliliters and acidulated with HCl. The precipitated acid agglomerates at about 60° C. When pasted with cold water the N-(3-amino-2,4,6-triiodobenzoyl)-N-phenylglycine forms coarse crystals.

Yield 17.7 grams, air-dried. Melting point about 128° C., smears.

After recrystallization out of 96% alcohol the Na salt is purepared by dissolving 9 grams acid in methanol and adding 5.9 milliliters 2.32 n methanolic NaOH. After precipitation with ether and drying at 110° C. for several hours, 8.6 grams of the Na salt of N-(3-amino-2,4,6-triiodobenzoyl-)-N-phenylglycine are obtained.

*Example 3*

1013.2 grams 3-amino-2,4,6-triiodobenzoyl chloride are dissolved in a minimum amount of hot dioxane and caused to flow into 700.6 grams molten methyl beta-anilino-propionate with stirring. After the ensuing exothermic reaction has gradually terminated the reaction mixture is heated on a steam bath for about 3 further hours and while boiling hot has then methanol and methanolic 3 n HCl added thereto, whereafter it is cooled. The precipitated solids are separated and washed with ether. 953 grams methyl beta-N-(3-amino-2,4,6-triiodobenzoyl)-phenylaminopropionate are obtained having a melting point of 156–157° C. Yield 74.2% of theory.

The methyl ester may be precipitated as the free acid by dissolving in dioxane, addition of 3.15 n methanolic sodium hydroxide solution, pouring the resulting reaction mixture in water, and acidulating the solution with 6 n HCl. After separation and drying, 553.6 grams beta-N-(3 - amino - 2,4,6 - triiodobenzoyl) - phenylaminopropionic acid having a melting point of 133–134.5° C. are obtained from 571 grams methyl ester. Overall yield 73.46% of theory.

*Example 4*

4.2 grams methyl 3-carboxyanilinopropionate prepared by an addition of m-aminobenzoic acid to methyl acrylate in the presence of glacial acetic acid are heated for 10 minutes together with 10.8 grams 3-amino-2,4,6-triiodobenzoyl chloride, 12 grams dioxane and 4 grams triethylamine, whereafter the vacuum evaporation residue is obtained and treated with methanol at elevated temperatures. The resulting methanolic solution is poured into a surplus of n NaOH. The solution is filtered clear and then poured into a surplus of hydrochloric acid. The precipitated acid is separated, washed several times with water and dried. 7.67 grams beta-N-(3-amino-2,4,6-triiodobenzoyl - 3'-carboxyanilino)propionic acid are obtained, which is 52.3% of theory. Melting point 140° C.

Example 5

26.67 grams 3-amino-2,4,6-triiodobenzoyl chloride are added to a solution of 16.5 grams methyl beta-N-beta'-hydroxyethyl-aminopropionate in about 5 milliliters acetone with cooling, which is subsequently removed. The mixture is slightly heated until the reaction ensues and is kept at about 100° C. during the reaction by cooling from time to time. After the reaction has been terminated the mixture is dissolved in 40 milliliters methanol and caused to flow into a surplus of ice-cold dilute HCl with stirring. The resulting precipitate is suction-filtered and after washing with ample water is dried in vacuum on sulfuric acid. 25.58 grams methyl beta-N-(3-amino-2,4,6 - triiodobenzoyl) - N - beta' - hydroxyethyl - beta - amino-propionate are obtained, which is 79.44% of theory.

In analogy to the foregoing examples the methyl ester may be transformed into the sodium salt by a treatment with alcoholic sodium hydroxide solution. From 25.58 grams ester, 20.73 grams sodium salt are obtained, having a decomposition temperature of about 220° C. When dissolved in water and precipitated with a surplus of hydrochloric acid this sodium salt can be transformed into the free beta-N-(3-amino-2,4,6-triiodobenzoyl)-N-beta'-hydroxyethyl-aminopropionic acid and having a melting point of 101–105° C. in an almost quantitative yield. Overall yield of free acid 63.58% of theory.

In analogous manner, 3-amino-2,4,6-triiodobenzoyl chloride can be reacted with

Methyl beta-ethylaminopropionate to obtain beta-N-(3-amino - 2,4,6 - triiodobenzoyl) - N - ethylamino - propionic acid having a melting point of 96–104° C., yield 57.1% of theory;

Methyl beta-butylaminopropionate to obtain beta-N-(3 - amino - 2,4,6 - triiodobenzoyl) - N - n - butylamino - propionic acid having a melting point of 78–86° C., yield 70.5% of theory;

Ethyl n-butylaminoacetate to obtain N-(3-amino-2,4,6-triiodobenzoyl-)-N-n-butylaminoacetic acid having a melting point of 81–86° C., yield 84.0% of theory.

Example 6

53.3 grams 3-amino-2,4,6-triiodobenzoyl chloride are suspended in 12 milliliters acetone and have gradually added thereto a mixture of 12 grams triethylamine and 11.6 grams methyl N,N'-ethylene-diamino-bis-beta-propionate (prepared by an addition of two moles methyl acrylate to ethylene diamine and purification by forming the hydrochloride). The exothermic reaction ensues immediately and causes the acetone to boil. After the reaction has gradually terminated the mixture is heated for about 20 minutes on a water bath and is then introduced into a surplus of dilute, cold hydrochloric acid with vigorous stirring. The resulting precipitate is separated and dried. 58.0 grams methyl ethylenediamino-N,N'-bis-(3-amino - 2,4,6 - triiodobenzoyl) - N,N' - bis - beta - propionate are obtained, which is 94.6% of theory.

By dissolving in dioxane and a treatment with somewhat more than the calculated amount of methanolic NaOH the methyl ester can be transformed into the sodium salt in analogy to the foregoing example. From this sodium salt the free acid can be obtained by dissolving the salt in water and precipitating with a surplus of HCl. When thus treated, 58 grams methyl ester give 41.6 grams ethylenediamino-N,N'-bis-(3-amino-2,4,6-triiodobenzoyl)-N,N'-bis-beta-propionic acid having an unsharp melting point at 180° C. Overall yield 69.45% of theory.

In an analogous manner, 3-amino-2,4,6-triiodobenzoyl chloride can be reacted with Methyl hexamethylenediamino-N,N'-bis - beta - propionate to obtain the amorphous hexamethylenediamino-N,N'-bis-(3-amino-2,4,6-triiodobenzoyl) - N,N' - bis - beta - propionic acid, which softens from 130° C. upwards, yield 67.5% of theory;

Methyl hexamethylenediamino-N,N'-bis-alpha-butyrate to obtain the amorphous hexamethylenediamino-N,N'-bis-(3-amino-2,4,6-triiodobenzoyl)-N,N'-bis - alpha - butyric acid, which softens from 130° C. upwards, yield 48.1% of theory.

In the preceding examples the alkyl alkylamino-acetates may be replaced by equimolar amounts of other aminoacetic acid derivatives such as Ethyl cyclohexylamino-acetate
Ethyl cyclopentylamino-acetate
Ethyl alpha-butylamino-butyrate and the alkyl beta-alkylamino-propionates may be replaced by equimolar amounts of Methyl beta-cyclohexylamino-propionate
Ethyl beta-cyclopentylamino-propionate The iodated aminobenzoic acid amides according to the present invention such as have been described in the foregoing examples are X-ray contrast agents preferably for oral administration and have been used with success to show the gall-bladder.

In clinical examinations carried out, e.g., with beta-N-(3 - amino-2,4,6-triiodobenzoyl)-N-phenylaminopropionic acid and with its sodium salt it was found that a shade of the gall bladder becomes often visible as soon as 1½ hours after an oral administration of 2–3 grams. Suitably the substance is administered on the eve of the examination. In the few cases in which a showing of the gall-bladder was not possible with the aid of the above-mentioned compounds the operation always showed severe pathologic changes of this organ. It is remarkable that secondary effects such as vomiting or diarrhea have not been observed so far.

The following examples can be given of the composition of X-ray contrast agents according to the invention:

Example 7

500 milligrams beta-N-(3-amino-2,4,6-triiodobenzoyl)-N-phenylaminopropionic acid
165 milligrams amylum tritici
30 milligrams talcum venetum
5 milligrams magnesium stearate give a composition having a total weight of 700 milligrams, which is used to make tablets.

A core of this composition having a weight of 350 milligrams can be used to make dragées by coating it with a composition consisting of 240 milligrams saccharum album
6 milligrams gelatine
3.6 milligrams polyethylene glycol
0.3 milligram coloring matter The acids according to Examples 1, 2 and 5 can be processed to form tablets or dragées in an analogous manner.

Example 8

500 milligrams beta-N-(3-amino-2,4,6-triiodobenzoyl)-N-phenylaminopropionic acid sodium salt
163 milligrams amylum maidis
30 milligrams talcum venetum
5 milligrams magnesium stearate
2 milligrams lauryl alcohol sulfonate give a composition having a total weight of 700 milligrams, which is directly processed to form tablets.

Tablet cores having a weight of 350 milligrams can be processed to form dragées with the following coating composition per dragée:

170 milligrams saccharum album
70 milligrams talcum venetum
6 milligrams gelatine
4 milligrams polyethyleneglycol The salts of the acids according to Examples 1, 2 and 5 may be processed analogously.

*Example 9*

250 milligrams beta-N-(3-amino-2,4,6-triiodobenzoyl)-N-ethylaminopropionic acid
135 milligrams amylum solani
30 milligrams saccharum lakticum
30 milligrams talcum venetum
5 milligrams magnesium stearate give 350 milligrams of a composition which can be processed to form a tablet core and coated with the following composition:

117 milligrams saccharum album
33 milligrams talcum venetum
100 milligrams polyethylene glycol.

What is claimed is:

1. An iodine containing amino benzoic acid amide compound selected from the group consisting of compounds having the formula

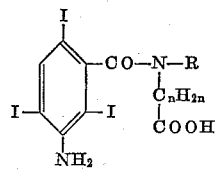

wherein R is selected from the group consisting of the phenyl radical and alkyl having 1 to 4 carbon atoms and $n$ is an integer from 1 to 2 and the salts thereof with non-toxic bases.

2. Beta-N-(3-amino-2,4,6-triiodobenzoyl)-N-ethylamino-propionic acid.
3. Beta-N-(3-amino-2,4,6-triiodobenzoyl)-N-phenyl-amino-propionic acid.
4. Sodium-beta-N-(3-amino-2,4,6-triiodobenzoyl)-N-(n)-butylamino-propionate.
5. Sodium-N-(3-amino-2,4,6-triiodobenzoyl)-N-(n)-butyl-amino-acetate.
6. N-(3-amino-2,4,6-triiodobenzoyl)-N-phenyl-glycine.

7. A method of producting an iodine containing amino benzoic acid amide compound having the formula

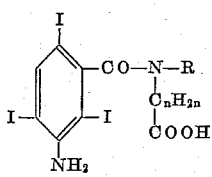

wherein R is selected from the group consisting of the phenyl radical and alkyl having 1 to 4 carbon atoms and $n$ is an integer from 1 to 2 which comprises reacting 3-amino-2,4,6-triiodobenzoyl chloride with an amino acid ester having the formula

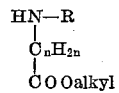

wherein R and $n$ have the meanings defined above, at temperatures below 160° C. to form an ester and reacting said ester with a saponifying agent.

8. A method of claim 7 in which said chloride is reacted with said amino acid ester in the presence of a minor amount of an inert organic solvent.

References Cited in the file of this patent

UNITED STATES PATENTS

| | | |
|---|---|---|
| 2,160,413 | Dohrn et al. | May 30, 1939 |
| 2,680,133 | Wallingford | June 1, 1954 |

FOREIGN PATENTS

| | | |
|---|---|---|
| 465,994 | Great Britain | May 20, 1937 |

OTHER REFERENCES

Whitmore: "Organic Chemistry," second ed. (1951), page 177.

Priewe et al.: "Chem. Abst.," vol. 49 (1955), page 9561.